(12) United States Patent
Maetz et al.

(10) Patent No.: US 7,971,224 B2
(45) Date of Patent: Jun. 28, 2011

(54) INTERACTIVE TELEVISION RECEPTION AND TRANSMITTING PROCESSES AND ASSOCIATED DEVICES

(75) Inventors: Yves Maetz, Rennes (FR); Ralf Schaefer, Acigné (FR)

(73) Assignee: Thomson Licensing, Boulogne-Billancourt (FR)

( * ) Notice: Subject to any disclaimer, the term of this patent is extended or adjusted under 35 U.S.C. 154(b) by 621 days.

(21) Appl. No.: 10/529,995

(22) PCT Filed: Oct. 2, 2003

(86) PCT No.: PCT/EP03/50678
§ 371 (c)(1),
(2), (4) Date: Oct. 25, 2005

(87) PCT Pub. No.: WO2004/032485
PCT Pub. Date: Apr. 15, 2004

(65) Prior Publication Data
US 2006/0156371 A1   Jul. 13, 2006

(30) Foreign Application Priority Data

Oct. 7, 2002 (FR) .................................... 02 12412

(51) Int. Cl.
*H04N 7/173* (2006.01)
(52) U.S. Cl. ......... 725/110; 725/109; 725/134; 725/135
(58) Field of Classification Search .................. 725/50, 725/135, 140, 152, 109, 110, 134
See application file for complete search history.

(56) References Cited

U.S. PATENT DOCUMENTS

| 5,966,120 A | 10/1999 | Arazi et al. |
| 6,460,180 B1 * | 10/2002 | Park et al. ........................ 725/40 |
| 2002/0059623 A1 * | 5/2002 | Rodriguez et al. .............. 725/91 |
| 2003/0163832 A1 * | 8/2003 | Tsuria et al. ................... 725/135 |
| 2004/0236778 A1 * | 11/2004 | Junqua et al. ................. 707/100 |

FOREIGN PATENT DOCUMENTS

| EP | 0989743 | 3/2000 |
| WO | WO 00/64172 | 10/2000 |
| WO | WO 00/76213 A1 | 12/2000 |
| WO | WO 01/31920 | 5/2001 |
| WO | WO 01/50763 | 7/2001 |
| WO | WO 01/50763 A1 | 7/2001 |
| WO | WO 02/32139 | 4/2002 |
| WO | WO 02/39745 | 5/2002 |

OTHER PUBLICATIONS

Search Report Dated Feb. 17, 2004.

* cited by examiner

*Primary Examiner* — Brian T Pendleton
*Assistant Examiner* — Nnenna Ekpo
(74) *Attorney, Agent, or Firm* — Robert D. Shedd; Vincent E. Duffy; Joel M. Fogelson

(57) ABSTRACT

A method for activating several applications, where a received start up application determines whether a first application or a second application will be activated. The first application, which is received, along with the start up application, is activated if a file of additional data is not present in a memory. Conversely, the second application will be activated if the file is present in the memory.

14 Claims, 7 Drawing Sheets

INTERACTIVE TELEVISION RECEPTION AND TRANSMITTING PROCESSES AND ASSOCIATED DEVICES

This application claims the benefit, under 35 U.S.C. §365 of International Application PCT/EP03/50678, filed Oct. 2, 2003, which was published in accordance with PCT Article 21(2) on Apr. 15, 2004 in English and which claims the benefit of French patent application No. 0212412, filed Oct. 7, 2002.

FIELD OF THE INVENTION

The invention relates to an interactive television system. It is more particularly applicable to the cases where the television reception system is connected to a domestic digital network. It is therefore concerned in particular with a system comprising means of interactive digital television transmission and user stations or terminals for reception of interactive digital television.

The invention applies equally to a standardized interactive digital television system (Multimedia Home Platform or MHP standard, for example) as to a proprietary system (such as that implemented by the OpenTV company for example).

BACKGROUND OF THE INVENTION

Devices are known in the art which make provision for the recording, by means of decoders, of interactive programmes. The latter subsequently enable a user to interact, during the viewing of an application. For example, the document WO-01/50763 discloses the automatic recording of an auxiliary programme according to preset criteria, with a view to subsequent use by the user. Document WO-00/76213 relates to a prior recording of a software application, then of a television programme corresponding to the moment of its broadcasting, with appropriate markings for the interactivity relating to this application and the option for the user to trigger the interactive programme.

In interactive digital television systems, the broadcaster provides the terminal with a digital stream. This stream contains multiplexed data which make it possible to reconstruct the initial streams: for example video streams, audio streams, signalling data and interactive application.

For reasons of broadcasting cost and of downloading time, the broadcasters and providers of services tend to minimize the size of the applications. An effect of this is the non-existence of applications that contain additional content such as real-time video sequences enhancing broadcast programmes. Now, the use of these sequences may be very beneficial for the production of interactive adverts for example.

The prior downloading to the terminal of sophisticated applications can be envisaged, and may make it possible for data which it would be impractical, or even impossible, to download with the stream broadcast upon the triggering of an application to be made available locally. However, such an approach requires a coherent system that executes in a rather complex way, since it is necessary to organize a prior downloading of the applications into all the receivers concerned. In practice, receivers that have been unable to download the applications in the requisite time cannot benefit from the associated interactive services. Now, several factors might compromise the local availability of these applications: insufficient storage space, overly restricted bandwidth, failed prior connection to a network (for example the Internet) for downloading, etc.

Document EP-0989743 discloses a method of transmitting application data in a digital transport stream, these data relating to several services. An application data table, also transmitted, contains information about the applications transported in each service. This table enables in particular a decoder to decide whether or not to maintain applications when switching from one service to another (§[0148]), or whether download applications not yet present in the decoder but required by a new service (§[0121]).

Prior document WO-01/31920 describes a technique for managing multiple applications in a digital network, according to which a virtual application table ("VAT" table) is communicated to terminals. The latter are moreover furnished with authorization levels fixed by a multiapplications manager. On the basis of this information, each terminal is capable of constructing a local VAT table, which indicates those applications that the terminal must be furnished with, by downloading (p. 28, 1.3-27).

These latter two embodiments necessitate table tracking, management and utilization, which entails a relatively high level of complexity.

International application WO-00/64172 teaches a method for performing or otherwise a predefined action in a receiver, for example for selecting the display of information, as a function of the contents of triggers received by this receiver. This display is different depending on whether a predefined rule does or does not apply to the triggers received.

This technique requires that the management of the triggers be precisely coordinated with the chosen display schemes.

Patent US-2002/0059623 discloses a file system with dual mode in a television of a subscriber network. This system is designed to use local data when they are available and remote data (by downloading) in the converse case. The data required for services can be obtained beforehand by the receivers and be stored locally in the form of data relating to hyperlinks (§[0107]). Upon the execution of a corresponding service, a local application verifies the presence of these data in local memory and proposes to the user the execution of an improved version of the service using the hyperlinks (§[0109]).

Patent U.S. Pat. No. 5,966,120 describes a method for combining and distributing data with a pre-formatted real-time video. In a receiver, an augmented video programme is created by inserting selected portions of auxiliary data into a selected primary video programme. These auxiliary data may be stored beforehand in the receiver, so as to be utilized subsequently at the requisite time.

Prior document WO-02/32139 relates to systems and methods for providing media content on demand, for example on-demand video or audio content, or electronic publications. An interactive television furnished with appropriate means can retrieve further content corresponding to such selected media content, either at the same time as the latter is despatched, or by prior downloading (p. 42, 1.31-33). In the latter case, the interactive television is capable of also retrieving information associating the further content with the media content (p. 43, 1.9-14). The mode of display of the further content with respect to the media content may optionally be chosen by the user (p. 45, 1.4-7).

The potentialities of these latter three techniques remain restricted in practice to the displaying of small supplementary fields on the screen, added to the displaying of the base service, or to the introduction of sequences such as short advertising inserts.

SUMMARY OF THE INVENTION

The present invention relates to interactive television and transmitting processes (notably broadcasting) enabling the execution of sophisticated applications, while considerably reducing the risks of nontriggering of the applications.

The processes of the invention may be implemented in a reliable manner, without needing excessive resources.

The invention also relates to devices associated with these processes and offering the same advantages: interactive television receiver, digital television terminal and programme transmitting station, as well as corresponding computer programs.

The invention therefore relates to an interactive television process applicable to a system where at least one or more transmitting stations transmit programmes to receivers. This process comprises:

(a) reception in one of the receivers, of a startup application and of a normal application and triggering of the startup application causing execution of steps b) to d) hereinbelow;

(b) testing for the presence in a memory of the said receiver of at least one file of additional data;

(c) in the absence of this file or of these files of additional data in the memory, starting up of the normal application;

(d) if the file or files of additional data are present in the memory, starting up of an improved application using these files of additional data.

The expression "interactive television" is understood to mean a television allowing either interactivity between the broadcasting station and the receivers, by virtue of a return path, or local interactivity at the level of the receivers or of terminals downstream, or both:

The term "application" designates moreover a functional assembly designed to be executed at the level of receivers and/or of terminals downstream, in interaction with a user, preferably in a format rendering it suitable for being broadcast over a network. This functional assembly can in particular include content, in particular of audio and/or video type, software instructions and/or description pages (for example HTML or MHEG).

The distinction between startup normal and improved applications is of a functional nature, each of these applications fulfilling a specific role. However, in practice, they may be merged into functionalities of one and the same application, a kernel of which is designed for startup, and provided with modules dynamically linked to the kernel so as to allow normal or improved operations. Hybrid embodiments with two applications instead of one or of three may also be beneficial (an application for startup and normal operations or an application for startup and improved operations).

Further, several improved applications may also be provided likewise, that are respectively associated to the presence or the absence of several addonal data files.

Surprisingly, the process of the invention makes two distinct applications, offering variable levels of information, available simultaneously to the receivers. It is at the receiver level, as a function of the data available in memory, that the choice is made between these two applications. This approach contrasts with the known methods, which provide for complete unavailability of an application in the case where the receiver is not able to execute it, and which are for this reason centred around the adaptation of the execution capabilities of the terminals. It may offer great flexibility of implementation and of execution.

By way of illustration, the interactive television process is implemented in respect of an automobile advert. In the version associated with the normal application, photos of cars for sale are shown statically on the screen, while superimposing, in display windows, information relating to the features of the vehicles for sale (screen mixing text and light graphics).

On the other hand, in the version associated with the improved application, the television viewer is presented with video sequences with inlaid buttons, which make it possible to navigate from one sequence to another. A menu bar at the bottom of the screen makes it possible to change stream so as to view and/or hear recounted, specific features of the car.

More generally, the improved application advantageously expresses as video and/or sound sequences, elements expressed in a textual manner by the normal application.

The transmission of the programmes from the transmitting stations to the receivers is preferably done through broadcasting.

The receivers can consist of user terminals, or optionally of pooled or networked systems, able to make information in memory available for a plurality of terminals. In the latter case, the startup test and its side branches are implemented at the level of these systems, upstream of the terminals.

In a first form of use of the startup application, the latter executes steps b) to d) itself. The test and selection instructions for the application to be started up are therefore controlled directly by the broadcasting station. In a second form of use of the startup application, the test and selection instructions are implemented locally, at the level of the receivers. The startup application then only has a role of triggering these functionalities. The implementation of these latter in a receiver may be performed by initial downloading (via the Internet or via a general broadcast), or by direct installation in the receiver of an appropriate module.

Preferably, it is possible to "force" startup of the normal application, even when the files of additional data are available locally. Thus, a user can in certain cases avoid possible problems of slowdowns or of display (overloaded memory, required version of the plugware or plug-in not available, etc.), by using just the elementary version of the application.

The process of the invention advantageously comprises the following prior steps, the transmitting station comprising at least one link for bilateral communication with the receivers:

e) reception of a message proposing loading of the files of additional data into the receiver;

f) acceptance or refusal by a user of the receiver, of the proposed loading;

g) in case of refusal, exiting from the present process;

h) in case of acceptance, automatic downloading of the files of additional data which are usable subsequently by the startup application (A2) into the receiver, via the bilateral communication link;

i) recording in the said memory of the said receiver, of the files of additional data.

One of the objects of the invention may thus be to provide the user with the possibility of accepting or of refusing the loading of data possibly of various types (software, video and/or audio streams, pictures, alphanumeric information) and in this way to offer him several levels of payback of the application, depending on the presence of otherwise of these additional data.

In another advantageous form of downloading of the files of additional data, the return path is not used and the user interacts locally with the receiver to indicate that he wishes to obtain an improved version of the application. The receiver then automatically obtains the files of additional data from information communicated by the transmitting station with the loading proposal message. For example, the download is performed via the Internet, by broadcasting in a specific stream, or by a broadband stream via a DSL network.

In yet another form of downloading of the files of additional data, the user downloads them spontaneously from a communications network, such as for example the Internet.

He then needs to be informed sufficiently in advance of the availability of the information and of their location (for example by means of a programme guide, or of a transmitted advert).

Before step f), there is advantageously provision for the reception, by the receiver, of at least one cue regarding the contents of the files of additional data, this cue or cues preferably being chosen from among a size, a subsequent date of use, a date of expiry or of validity of the additional data, a date on which the additional data will be used, a broadcasting channel which will use the additional data, and a downloading address.

Before step h), there is advantageously provision for the user to indicate a choice of immediate downloading or of deferred downloading of the files of additional data.

It is also beneficial during step e), for the reception of the proposal message to be effected upon the reception of an application of the same type as the improved application.

According to a variant embodiment, the files of additional data contain the improved application. Alternatively, there is provision, during step a), for the user to also receive the improved application.

Moreover, the process of the invention preferably comprises a step of automatic erasing of the contents of the memory. It is also possible to provide for an automatic erasure system. A date of erasure is then advantageously associated with the files of additional data and the erasure step comprises a periodic operation of reading this date and an erasure operation when this date is reached. In another form of erasure of the contents of the memory, this erasure step is triggered by the user or by a command remotely controlled from the broadcasting station for example.

It should be noted that the files of additional data may equally well contain one or more pieces of software, video data, pictures, sound or a combination of these types of data.

Moreover, the invention advantageously implements an interactive television process applicable to a system where at least one transmitting station comprises at least one bilateral communication link to receivers. This process comprises the following steps:

a) sending of a message proposing loading of at least one file of additional data by a transmitting station to the receivers, with a view to an optional improvement of an application intended to be executed subsequently;

b) and upon acceptance by a user of one of the receivers, of the proposal message loading proposal, transmission to this receiver of the files of additional data.

This process, which is especially appropriate for the execution of the process defined above, preferably complies with the latter's schemes.

There is advantageously provision for the reception by a return path of an acceptance message originating from the user terminal, then the transferring of the additional data by this return path.

The invention applies also to an interactive television receiver comprising means for testing for the presence in a memory of the said receiver, of at least one file of additional data.

According to the invention, this receiver also comprises:
means of reception of a startup application and of a normal application,
and means of starting up the normal application in the absence of the files of additional data in the said memory and of starting up an improved application if the files of additional data are present in the memory.

This receiver is preferably designed to implement an interactive television process in accordance with any one of the forms of the invention. It is preferably furnished with a memory module capable of recording the files of additional data.

The subject of the invention is also a digital television terminal, characterized in that it comprises an interactive television receiver according to the invention.

Moreover, the invention applies to a process for transmitting applications by a transmitting station to interactive television receivers.

According to the invention, these applications comprise a startup application and a normal application, the startup application being intended to cause a test for the presence in a memory of at least one of the receivers, of at least one file of additional data, as well as to start up the normal application in the absence of these files of additional data and to start up an improved application using these files of additional data if these files are present.

This transmitting process preferably is intended to implement the interactive television process in accordance with any one of the forms of the invention.

The invention also pertains to a station for transmitting programmes to interactive television receivers. According to the invention, it comprises means of production and of transmission of at least one message comprising a startup application and a normal application The startup application is intended to cause a test for the presence in a memory of at least one of the receivers of at least one file of additional data, as well as to start up the normal application in the absence of these files of additional data and to start up an improved application using the files of additional data if these files are present.

This transmitting station is preferably intended to implement the transmitting process according to the invention.

A further subject of the invention is a computer program product comprising program code instructions for the execution of the steps of the process according to any one of the forms of the invention when this program is executed on a computer. The expression "computer program product" is understood to mean any realization of a computer program, it may be devised not only for storage media (cassettes, disks, etc.) but also for signals (electrical, optical, etc.).

BRIEF DESCRIPTION OF THE DRAWINGS

The various subjects characteristic of the invention will be more clearly apparent in the description which follows and in the appended figures which represent.

DETAILED DESCRIPTION OF THE INVENTION

Figure 1:
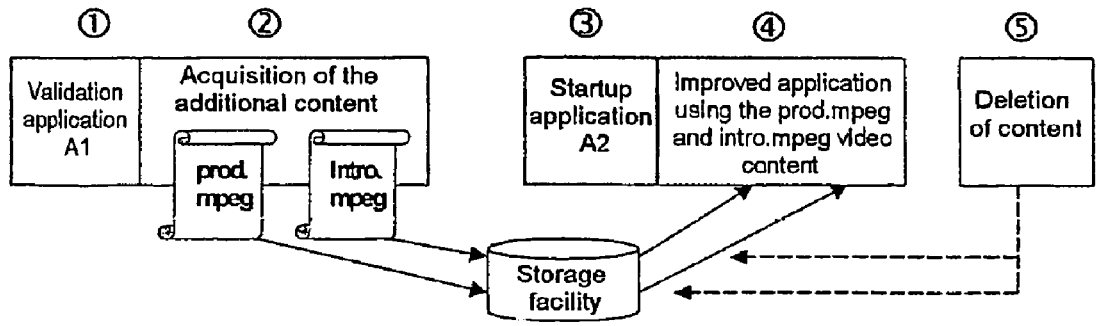
FIG. 1, a diagram illustrating the principle of the process of the invention.

Referring to FIG. 1, the principle of the invention will therefore be described.

A broadcasting station communicates in an interactive manner with one or more digital television user stations, also called reception terminals. Such a terminal must be able to receive, decode and display on a screen content of audiovisual and application package types, and is associated with a storage module allowing the local storage of the content.

As is represented in FIG. 1, the process provides for the following steps:

Step 1: Transmission by the broadcasting station and execution by the terminal of a first so-called validation application A1, through which it will be possible to validate the loading and the storage of files of additional data;

Step 2: Transmission to the terminal and acquisition by the latter of files of additional data, either by recording of these transmitted files, or by downloading from a server using a return path;

Step 3: Broadcasting and execution of a second so-called startup application A2 and testing for the presence of the files of additional data:
  if the files of additional data are absent, starting up of a normal application A3,
  if the files of additional data are present, starting up of an improved version A4 of the application, using the files of additional data;

Step 4: Execution of the application (normal version A3 or improved version A4);

Step 5: Deletion of the files of additional data after an expiry date, or upon a particular command from the user or from the broadcasting station.

Figure 3:
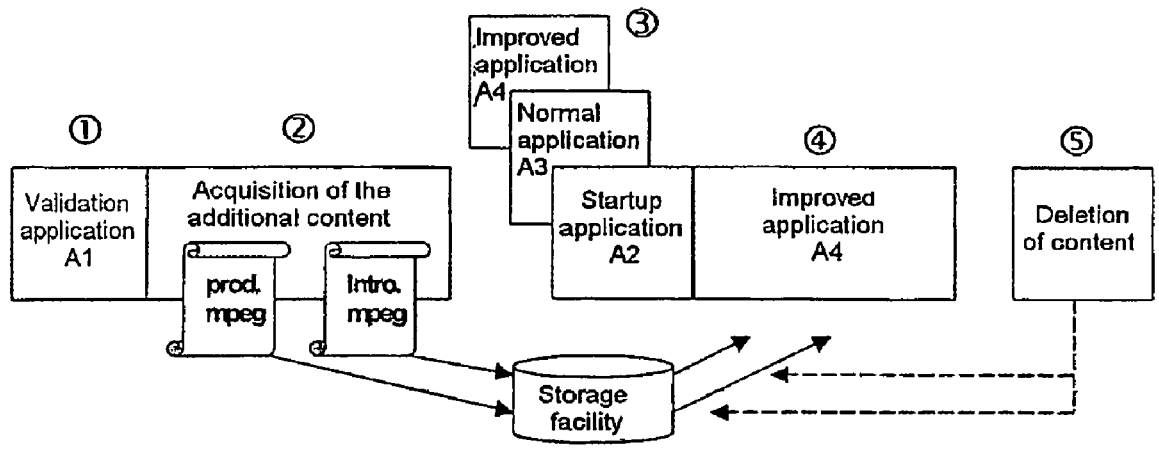
FIG. 3, an exemplary implementation of the process forming the subject of the flowcharts of FIGS. 2a and 2b.
Figure 2A:
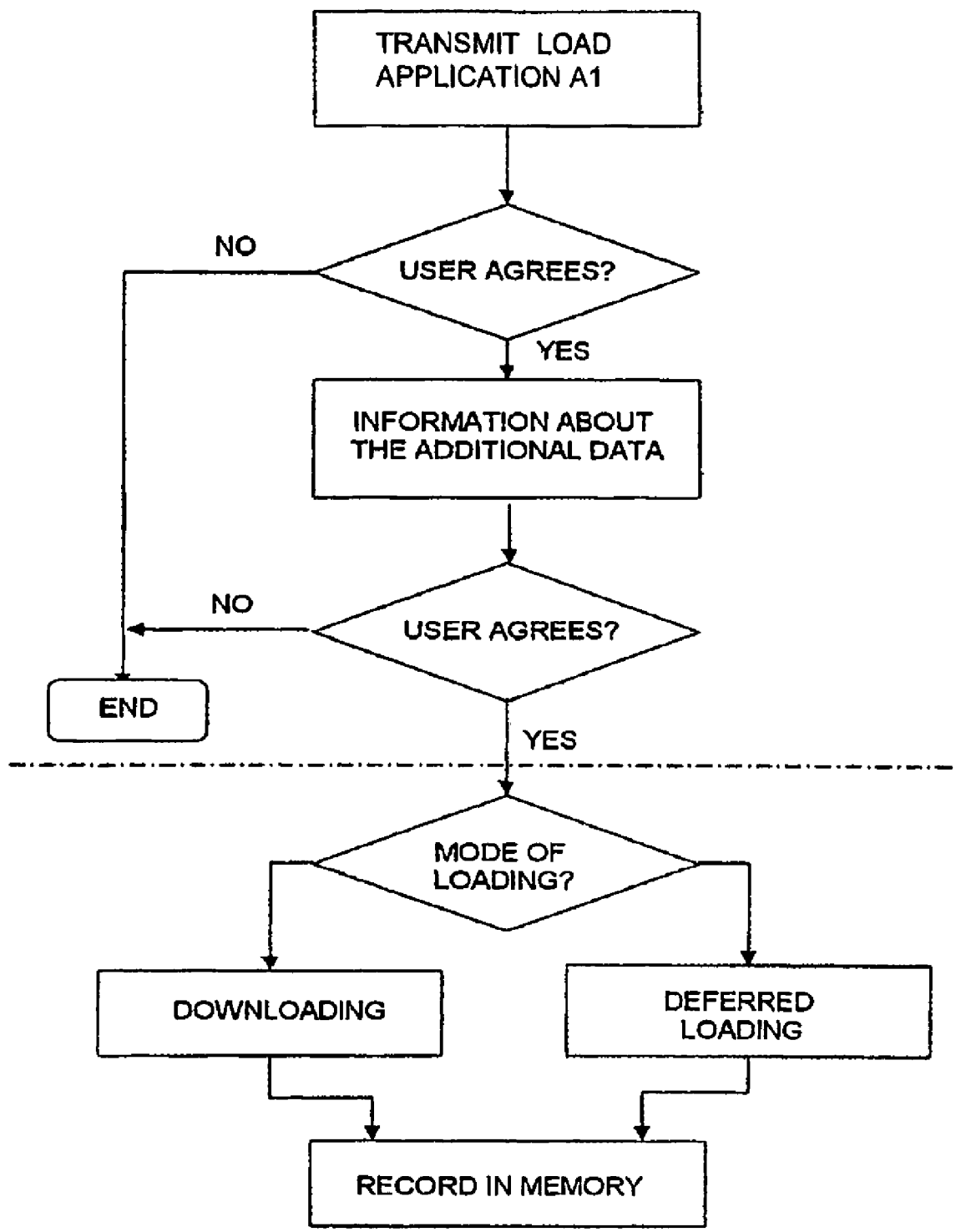
FIGS. 2a and 2b, flowcharts of an exemplary use of the process of the invention.
Figure 2B:
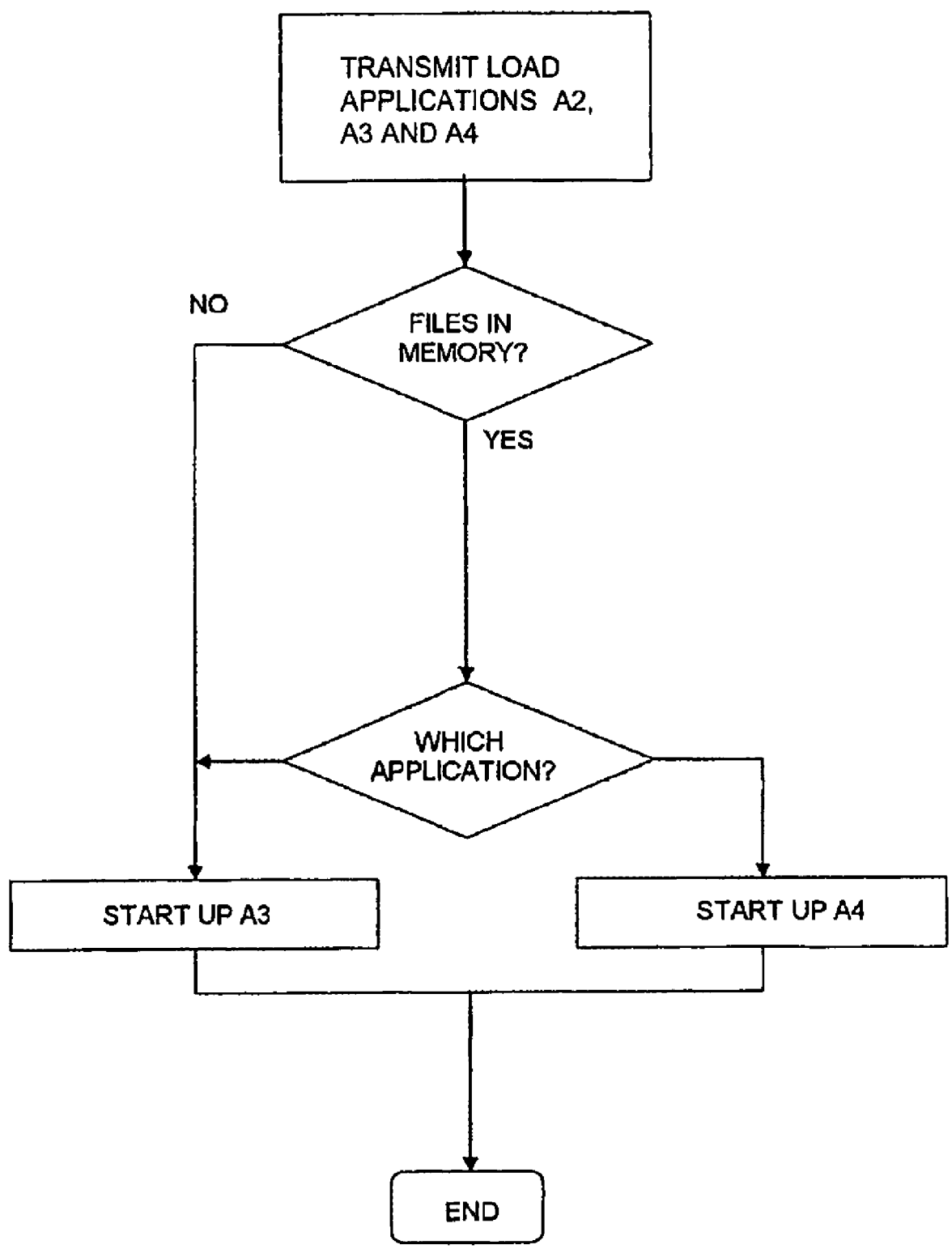

Referring to FIGS. 2a, 2b and 3, a more detailed exemplary use will now be described. According to this example, the files of additional data contain data making it possible to carry out in the required time an improved application, but do not contain the latter itself.

As represented in FIG. 2a, the application A1 is broadcast and is loaded into the user terminal. This application is broadcast during a normal transmission. It constitutes an interrogation and validation application destined for the user.

By way of illustration, the validation application A1 is broadcast during a trailer that presents a forthcoming event. For example, tomorrow afternoon, the "Tour de France" cycle race will reach Savoy. On this occasion, the service provider broadcasts the trailer with which an interactive application is associated, the aim of which is to entice the television viewer so that he authorizes the loading of the additional content.

Figure 4:
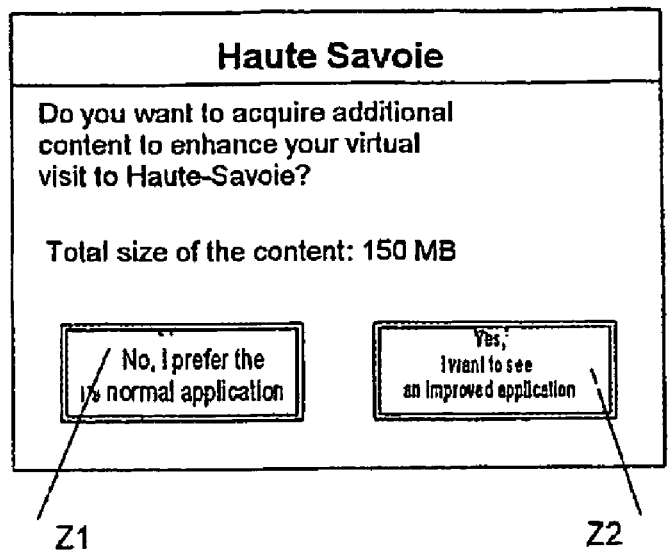
FIGS. 4, 5 and 6, examples of information viewed by the user within the framework of the process of the invention.

FIG. 4 illustrates the interactive application proposed during a trailer relating to the coming broadcast of a leg of the Tour de France. The screen of the terminal comprises two zones Z1 and Z2 allowing the user respectively to register or otherwise his interest in the application proposed.

The user will possibly have been informed of the content transfer time, of the possible unavailability of his terminal or of the return path and will optionally be able to choose the means by which he wishes to acquire this content.

He will therefore be able to authorize the storage of additional content on his appliance or on his network. It is this that is indicated in FIG. 2a in the form of the question "USER AGREES?".

If the user is not interested in the proposed application, and therefore if he does not agree to receive it, the procedure comes to an end. On the other hand, if he does agree, he responds positively and the system prepares itself to send him one or more files of additional data.

Beforehand, but this is not absolutely necessary, the broadcasting station transmits information about the contents of the file of additional data, such as configuration parameters enabling the terminal to download the contents from a URL or to record it (broadcasting service, time of broadcast, etc.), but also the size of the additional data. Depending on this information, the user responds if he agrees to receive the files of additional data. If not, the procedure comes to an end. In the case of a positive response, the system asks the user for the mode of loading that he wants ("MODE OF LOADING?"). Specifically, with the information emanating from the application, the terminal will be able either to download the content from a URL (standing for "Universal Resource Locator") address by virtue of the return path, or to programme a timer to record a broadcast service that will contain the additional content. This additional content may be broadcast at night, or on a service dedicated to the broadcasting of additional content.

In a preferred deployment, however, the user is not requested a second and a third time after having given his agreement to the storage of additional content, in order to indicate whether he is still in agreement in view of the information regarding the files of additional data. In this variant, the download decision is taken automatically at local level, taking account of the configuration of the terminal and/or of the files acquisition network. This configuration is for example specified beforehand by the user, in the course of a preliminary installation phase.

The file or files of additional data are then stored on a storage facility (hard disk for example) that may be integrated into the appliance, or on an external storage facility.

In the case of external storage, the connection between the terminal and the external storage facility is preferably effected using a standard digital domestic bus with the associated protocols (Firewire and HAVi for example) but may also be effected in a proprietary manner.

A directory in which all the additional content is stored is defined.

As is represented in FIG. 2a ("RECORDING IN MEMORY"), the files of additional data are recorded in memory.

Thereafter, a certain time after the broadcasting of the validation application A1 and after a delay sufficient to allow the terminal to finalize the acquisition of the files of additional data, the startup application A2, the normal application A3 and the improved application A4 are broadcast on the terminal (see FIGS. 2b and 3).

Next, the startup application A2 is executed on the user terminal.

The presence of the files of additional data is then tested for ("FILES IN MEMORY?").

In the case where the files are not in memory, the system triggers the starting up of the normal application A3.

In the case where the files of additional data are present in full in memory, the system proceeds to the starting up of the improved application A4.

Optionally, the user has the possibility however of in this case choosing the normal application A3 rather than the improved application A4 (see FIG. 2b).

FIG. 3 represents an exemplary implementation according to which the files of additional data contain only data (video, audio, pictures). The various previous steps are found again in this figure:

1. broadcasting of the validation application A1;
2. broadcasting on request and recording in a memory facility of a user terminal of additional content (files of additional data);
3. broadcasting of the normal application A3 and of the improved application A4 with the startup application A2;
4. starting up of the improved application A4.

Figure 5:
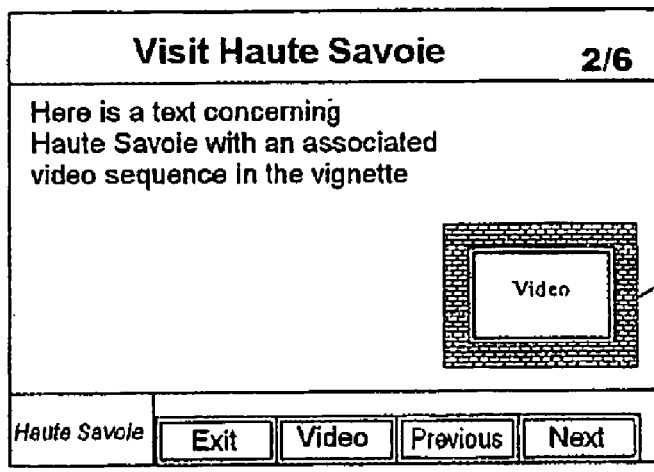

FIG. 5 represents an example corresponding to the message of FIG. 4 (selection of zone Z1), of an improved application where the vignette V to the right of the text represents a video sequence. The user can optionally view it in full screen mode by validating through an appropriate actuation.

Figure 6:
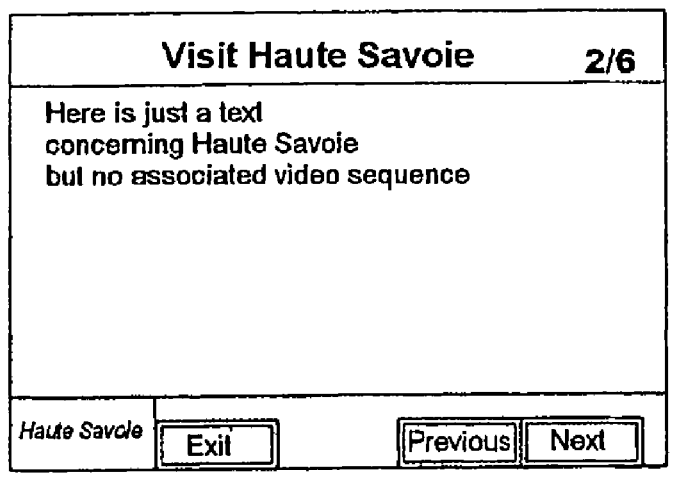

FIG. 6 shows an exemplary normal application also provided for in association with the message of FIG. 4 (selection of zone Z2).

Figure 8:
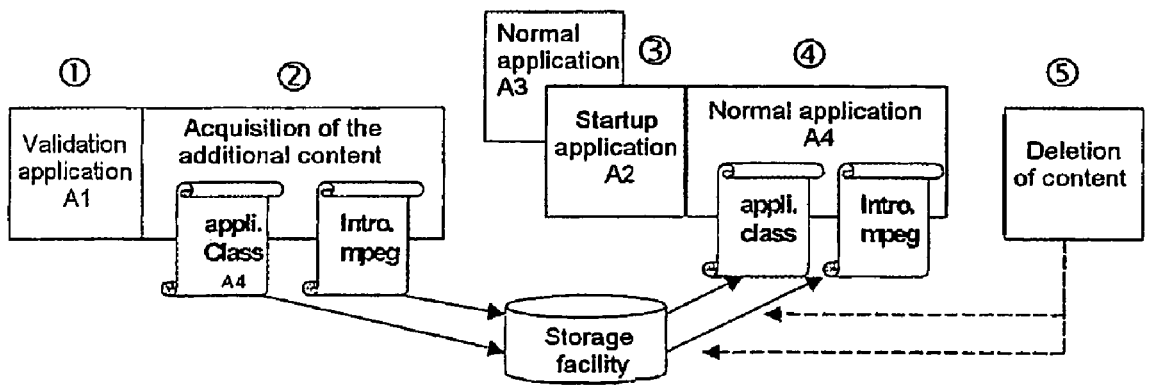
FIG. 8, an exemplary implementation of the process of FIG. 7.
Figure 7:
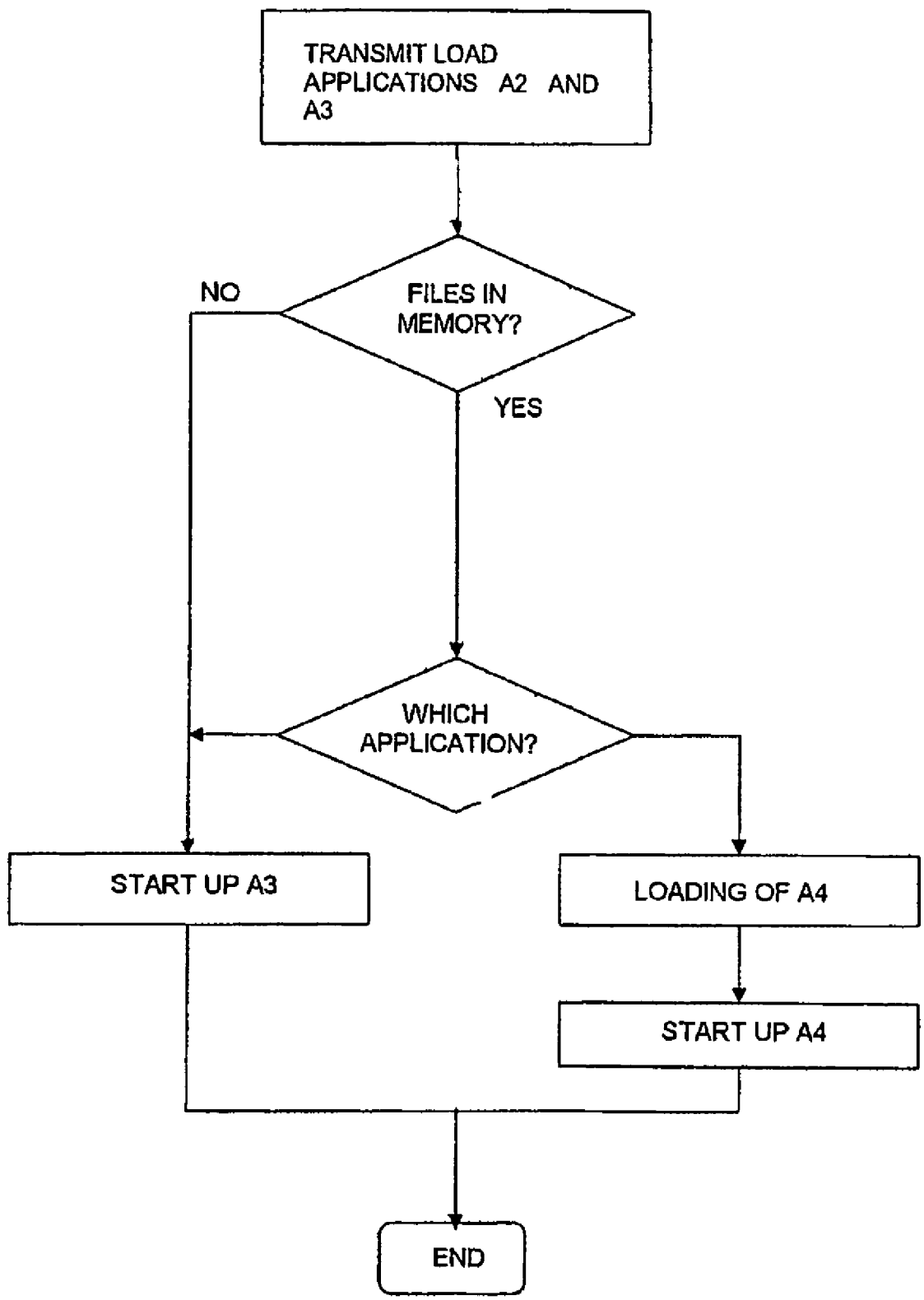
FIG. 7, a flowchart of another exemplary process according to the invention.

Referring to FIGS. 7 and 8, another exemplary implementation of the process of the invention will now be described. In this example, the procedure for proposing files of additional data to the user and that he load them into the user terminal is the same as that which was described in conjunction with FIG. 2a and will therefore not be described again. On the other hand, the files of additional data contain the improved application A4, this not having been the case previously.

As is represented in FIGS. 7 and 8, the normal application A3 and the startup application A2 form the subject of a broadcast and of a loading into the user terminal. As previously, the test in memory for the file or files of additional data is carried out. If these files are not in memory, the normal application A3 is started. If these files are in memory, the improved application A4 contained in the files of additional data is loaded into an execution memory ("LOADING OF A4") and then started ("STARTING OF A4")—unless the user possibly decides to choose the normal application A3.

The possibility should be noted of using a cache to store the normal application A3 broadcast before the startup application A2.

Moreover, the invention makes provision to delete the files of additional data from the memory of the user terminal, thus freeing some room on the storage device and avoiding its saturation.

For this purpose, an expiry data is associated with each file of additional data, thus allowing the terminal to delete files whose expiry date has elapsed. This possibility is indicated in FIGS. 1, 3 and 8.

The deletion from memory of the recorded files of additional data may also be ordered by the user himself or remotely by the broadcasting station.

Figure 9:
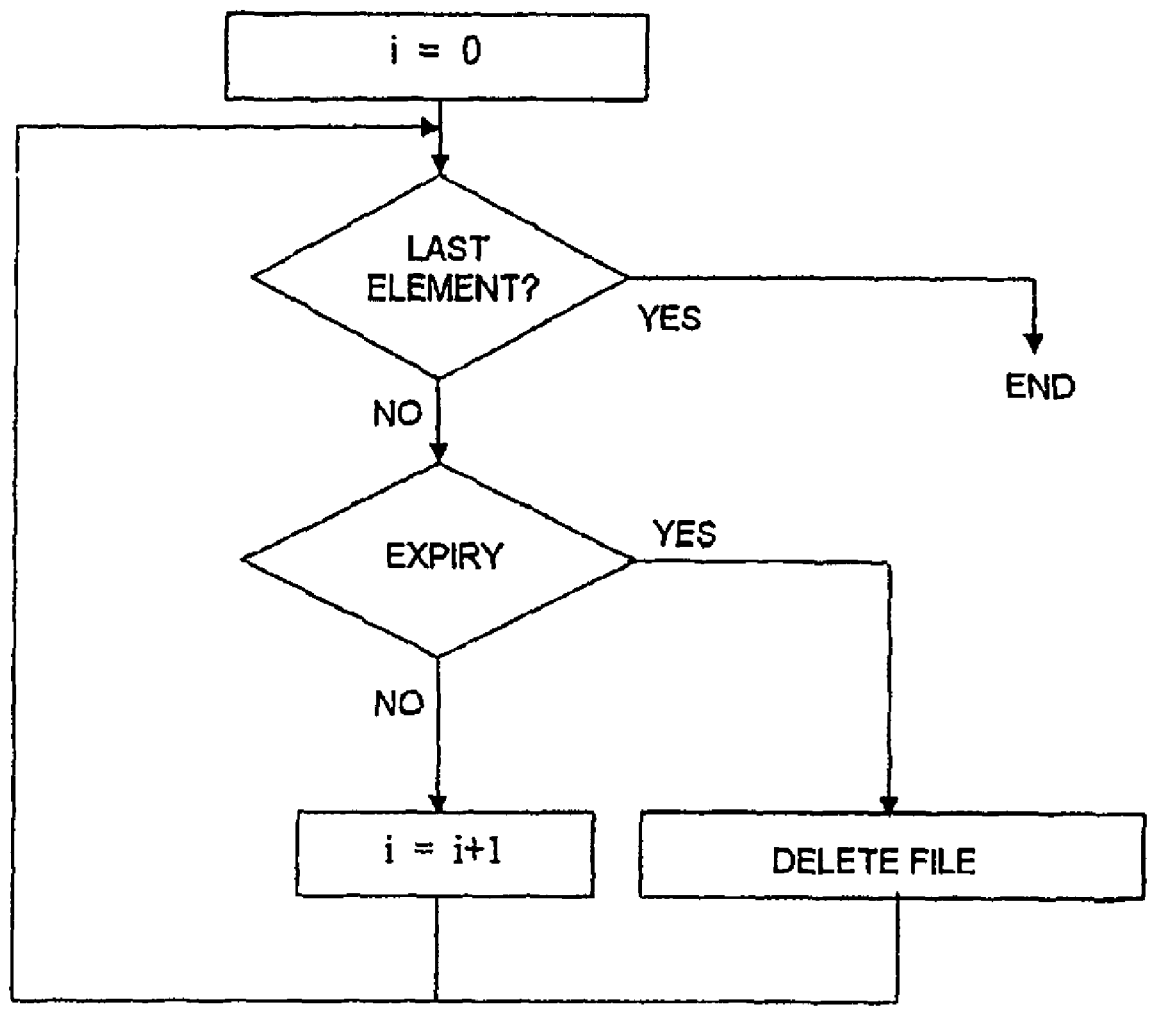
FIG. 9, a flowchart illustrating a procedure for erasing the additional data in memory of a user terminal.

FIG. 9 represents a flowchart of a process of programmed deletion of the files of additional data recorded in the memory of a user terminal.

During the loading of a file of additional data, an expiry date is associated with this file either by the broadcasting station, or by system, or by the user. This date is recorded in a zone of a memory table together with the address of the corresponding file of additional data. Periodically, the system explores the table, from the first address of this table (i=0) to the last zone of the table ("LAST ELEMENT?"). With each zone read, the expiry date is compared with the day's date. If it is not greater than the day's date, the system reads the contents of the next zone by indexing the table ("i=i+1").

If the expiry date is greater than the day's date, the file of additional data is deleted from the memory.

When all the zones have been explored, the system stops.

Figure 10:
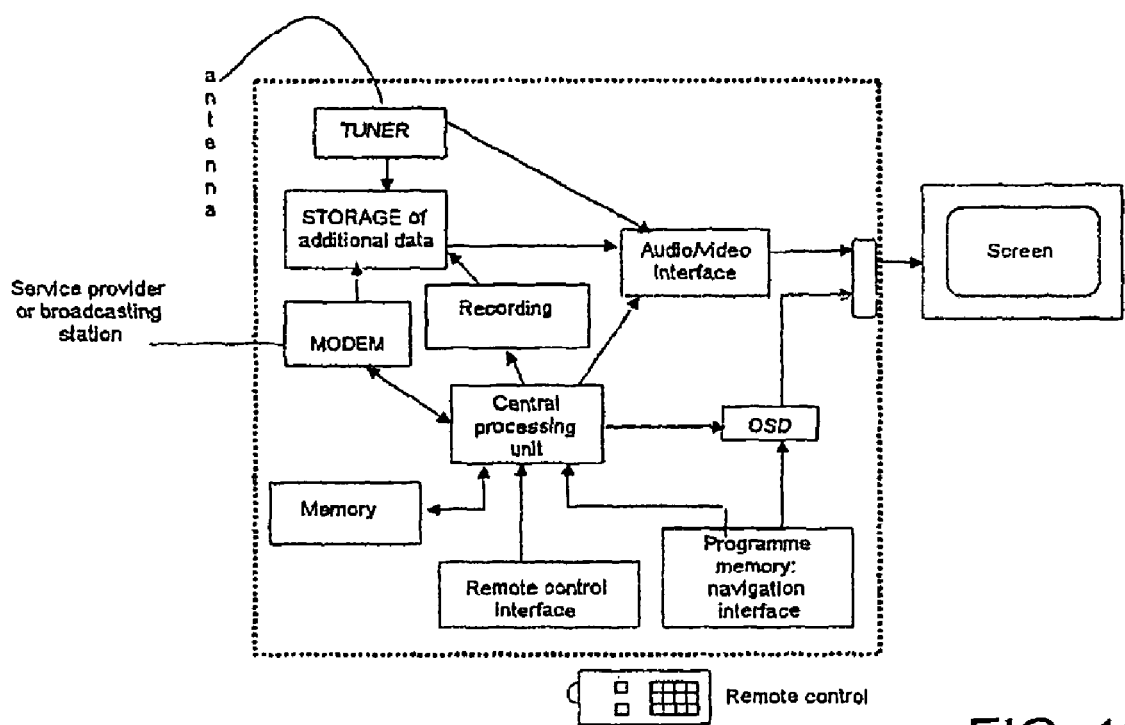
FIGS. 10 and 11, exemplary embodiments of user terminals enabling the invention to be employed.
Figure 11:
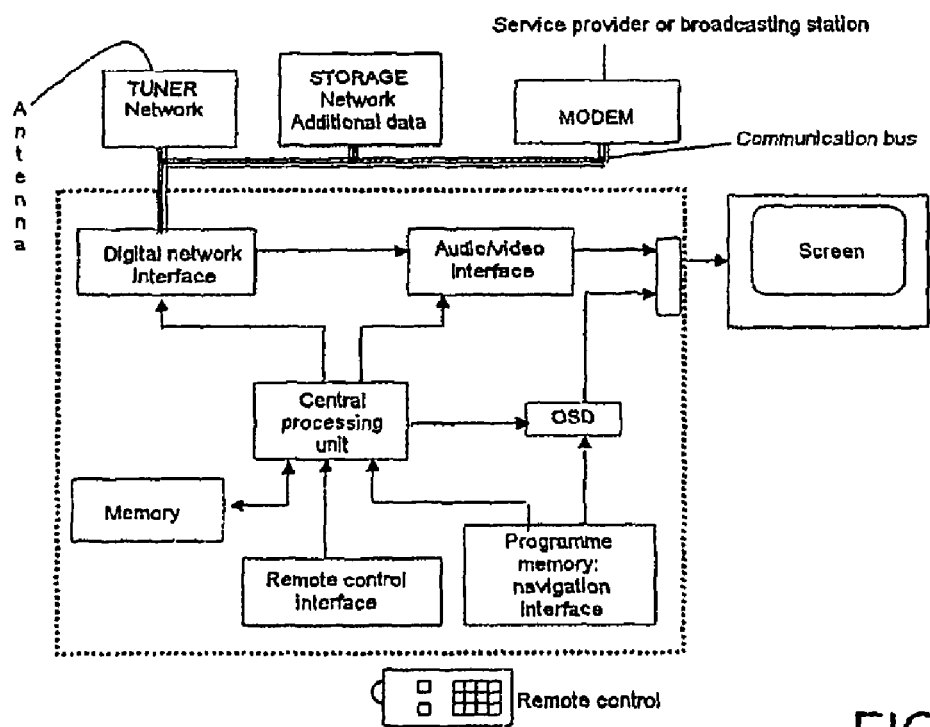

FIGS. 10 and 11 represent user terminals making it possible to employ the invention. These devices comprise a central processing unit which is connected to a programme memory and which can receive commands from a remote control interface. The central processing unit manages a screen display device or OSD (standing for On-Screen Display) and an audio/video interface for displaying transmissions on a screen.

In FIG. 10, reception is effected by a tuner and by an antenna making it possible to pick up transmissions broadcast over the airwaves, as well as by a modem connected (telephonically for example) to a service provider or to a broadcasting station and linked to the central processing unit. A device for recording additional data makes it possible to store the files of additional data in the user terminal's own memory, called "STORAGE of additional data".

In FIG. 11, a digital network interface of the user terminal is connected by a communication bus to a network tuner, to a network storage device for storing additional data and to a modem.

The terminal of FIG. 11 forms part of a network of terminals for which the files of additional data are stored in common by means of the network storage device, which comprises for example a recording module and an appropriate storage space. The reception tuner and the modem are also common to the network. The assembly is interconnected by the communication bus. The files of additional data are therefore received and stored by the network storage device by way of the tuner and of the modem.

The invention claimed is:

1. Interactive television process applicable to a system where at least one transmitting station transmits programs to receivers, the process comprising:
    a) reception in one of said receivers, of a startup application and of a first application, wherein a triggering of said startup application, where said startup application performs a test, causes an execution of steps b) to d);
    b) testing for a presence in a memory of the one of said receivers of at least one file of additional data;
    c) in the absence of said file of additional data in said memory, starting up of the first application;
    d) if said file of additional data is present in said memory, starting up of a second application, said second application using said file of additional data, where each of said applications is a functional assembly designed for execution at the level of the one of said receivers.

2. Interactive television process according to claim 1, wherein, with said transmitting station comprises at least one link for bilateral communication with said receivers, said process comprises the following prior steps:
    e) reception of a message proposing loading of said file of additional data into the one of said receivers;
    f) acceptance or refusal by a user of the one of said receivers, of the proposed loading;
    g) in case of refusal, exiting from the present process;
    h) in case of acceptance, automatic downloading of said file of additional data which is usable subsequently by said startup application into the one of said receivers, via said bilateral communication link;
    i) recording in said memory of the one of said receivers, of said file of additional data.

3. Interactive television process according to claim 2, comprising, before step f), the reception, by the one of said receivers, of at least one cue regarding the contents of said file of additional data, said cue preferably being chosen from among a size, a subsequent date of use, a date of expiry or of validity of the additional data, a date on which the additional data will be used, a broadcasting channel which will use the additional data, and a downloading address.

4. Interactive television process according to claim 2, comprising, before step h), a step in the course of which the user indicates a choice of immediate downloading or of deferred downloading of said file of additional data.

5. Interactive television process according to claim 2, wherein during step e), the reception of the proposal message is effected upon the reception of an application of the same type as the second application.

6. Interactive television process according to claim 1, wherein said file of additional data contains an additional application.

7. Interactive television process according to claim 1, wherein during step a), the one of said receivers also receives said second application.

8. Interactive television process according to claim 1, comprising a step of automatic erasing of the contents of said memory.

9. Interactive television process according to claim 8, wherein a date of erasure is associated with said file of additional data and in that the erasure step comprises a periodic operation of reading this date and an erasure operation when this date is reached.

10. Interactive television process according to claim 1, wherein said file of additional data contains data chosen from among at least a piece of software, video data, pictures, sound and a combination of these types of data.

11. Interactive television receiver comprising means for testing for the presence in said memory of the one of said receivers, of at least one file of additional data, comprising:
   means of reception of said startup application and of said first application;
   and means of starting up the first application in the absence of said file of additional data in said memory and of starting up a second application if said file is present in said memory, said second application using said file of additional data,
   where each of said applications is a functional assembly designed to be executed at the level of the one of said receivers, and said receiver preferably being designed to implement an interactive television process in accordance with claim 1.

12. Digital television terminal, comprising an interactive television receiver according to claim 11.

13. Process for transmitting applications by a broadcasting station to interactive television receivers, wherein each of said applications is a functional assembly designed to be executed at the level of said receivers and said applications comprise said startup application and said first application, said startup application being intended to cause said test for the presence in a memory of the one of said receivers, of at least one file of additional data, as well as to start up the first application in the absence of said file of additional data and to start up a second application if said file is present, said second application using said file of additional data, said transmitting process preferably being intended to implement said interactive television process in accordance with claim 1.

14. Station for transmitting programs to interactive television receivers, comprising means of production and of transmission of at least one message comprising said startup application and said first application, said startup application being intended to cause said test for the presence in a memory of at least one of said receivers of at least one file of additional data, as well as to start up the first application in the absence of said file of additional data and to start up said second application if said file is present, said second application using said file of additional data, where each of said applications is a functional assembly designed to be executed at the level of the one of said receivers and said transmitting station preferably being intended to implement the transmitting process according to claim 13.

* * * * *